US007349846B2

(12) United States Patent
Aizawa

(10) Patent No.: US 7,349,846 B2
(45) Date of Patent: Mar. 25, 2008

(54) INFORMATION PROCESSING APPARATUS, METHOD, PROGRAM, AND STORAGE MEDIUM FOR INPUTTING A PRONUNCIATION SYMBOL

(75) Inventor: Michio Aizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/807,305

(22) Filed: Mar. 24, 2004

(65) Prior Publication Data

US 2004/0199377 A1 Oct. 7, 2004

(30) Foreign Application Priority Data

Apr. 1, 2003 (JP) ............................ 2003-098039

(51) Int. Cl.
*G10L 13/08* (2006.01)
*G10L 21/00* (2006.01)
*G09B 19/04* (2006.01)

(52) U.S. Cl. ....................... 704/260; 704/270; 434/167

(58) Field of Classification Search .................... 704/1, 704/9, 249, 254, 270, 276, 258, 260; 434/156-161, 434/167

See application file for complete search history.

(56) References Cited

U.S. PATENT DOCUMENTS 5,805,911 A * 9/1998 Miller ........................ 715/534
5,845,300 A * 12/1998 Comer et al. ............... 715/508
5,896,321 A * 4/1999 Miller et al. ........... 365/189.01
5,995,928 A * 11/1999 Nguyen et al. ............. 704/251
6,016,471 A * 1/2000 Kuhn et al. ................. 704/266
6,029,132 A * 2/2000 Kuhn et al. ................. 704/260
6,092,044 A * 7/2000 Baker et al. ................ 704/254
6,230,131 B1 * 5/2001 Kuhn et al. ................. 704/266
6,233,553 B1 * 5/2001 Contolini et al. ........... 704/220
6,363,342 B2 * 3/2002 Shaw et al. ................. 704/220
6,377,965 B1 * 4/2002 Hachamovitch et al. .... 715/534
6,501,833 B2 * 12/2002 Phillips et al. ........... 379/88.07
6,606,597 B1 * 8/2003 Ringger et al. ............. 704/270
6,829,607 B1 * 12/2004 Tafoya et al. .................. 707/6
6,934,675 B2 * 8/2005 Glinski et al. ................. 704/9
6,999,918 B2 * 2/2006 Ma et al. ....................... 704/10
7,099,828 B2 * 8/2006 Kobal et al. ................ 704/270
7,139,706 B2 * 11/2006 Yuschik ...................... 704/243
7,171,362 B2 * 1/2007 Hain .......................... 704/267

FOREIGN PATENT DOCUMENTS

JP 7-78133 3/1995

* cited by examiner

*Primary Examiner*—Patrick N. Edouard
*Assistant Examiner*—Joel Stoffregen
(74) *Attorney, Agent, or Firm*—Fitzpatrick, Cella, Harper & Scinto

(57) ABSTRACT

An information processing apparatus for inputting a pronunciation symbol corresponding to an English notation includes pronunciation symbol information holding means for holding pronunciation symbol information indicating a relationship between a predetermined alphabet and a pronunciation symbol that starts from the predetermined alphabet, pronunciation symbol statistical information holding means for holding statistical information associated with the probability of occurrence of each pronunciation symbol immediately after a predetermined pronunciation symbol, display means for extracting pronunciation symbols corresponding to an input alphabet from the pronunciation symbol information, and displaying the extracted pronunciation symbols while sorting them on the basis of the statistical information, and determination means for determining a pronunciation symbol corresponding to the English notation from the displayed pronunciation symbols.

4 Claims, 9 Drawing Sheets

FIG. 3

| ALPHABET | PRONUNCIATION SYMBOL CANDIDATE |
|---|---|
| a | AA, AE, AH, AO, AW, AY |
| b | B |
| c | CH |
| d | D, DH |
| e | EH, ER, EY |
| f | F |
| g | G |
| h | HH |
| i | IH, IY |
| j | JH |
| k | K |
| l | L |
| m | M |
| n | N, NG |
| o | OW, OY |
| p | P |
| q | |
| r | R |
| s | S, SH |
| t | T, TH |
| u | UH, UW |
| v | V |
| w | W |
| x | |
| y | Y |
| z | Z, ZH |

FIG. 4

| ALPHABET | PRONUNCIATION SYMBOL CANDIDATE |
|---|---|
| a | AA, AE, AH, AO, AW, AY, EH, ER, EY, IH, IY, OW |
| b | B |
| c | CH, K, S, SH |
| d | D, JH |
| e | AA, AH, AY, EH, ER, EY, IH, IY, OW |
| f | F |
| g | G, JH, ZH |
| h | HH |
| i | AH, AY, ER, IH, IY |
| j | HH, JH, Y, ZH |
| k | K |
| l | L |
| m | M |
| n | N, NG |
| o | AA, AH, AO, AW, ER, OW, OY, UW |
| p | F, P |
| q | K |
| r | R |
| s | S, SH |
| t | CH, DH, SH, T, TH |
| u | AH, AO, ER, UH, UW, Y |
| v | V |
| w | HH, W |
| x | K, Z |
| y | Y |
| z | Z, ZH |

FIG. 5

| FORWARD PRONUNCIATION SYMBOL | PRONUNCIATION SYMBOL OF INTEREST | STATISTICAL VALUE |
|---|---|---|
| Φ | AA | 3 |
| AA | AA | 20 |
| AE | AA | 17 |
| AH | AA | 32 |
| AO | AA | 13 |
| ... | | ... |
| ZH | AA | 6 |
| Φ | AE | 5 |
| AA | AE | 21 |
| AH | AE | 31 |
| ... | ... | ... |
| ZH | AE | 8 |
| ... | ... | ... |
| Φ | ZH | 8 |
| AA | ZH | 47 |
| AE | ZH | 43 |
| AH | ZH | 53 |
| AO | ZH | 97 |
| ... | ... | ... |
| ZH | ZH | 213 |

FIG. 6

| ALPHABET PRONUNCIATION SYMBOL | IMAGE PRONUNCIATION SYMBOL |
|---|---|
| AA | α |
| AE | æ |
| AH | ʌ |
| AO | ɔ : |
| AW | a u |
| AY | a i |
| B | b |
| CH | t ʃ |
| D | d |
| DH | δ |
| EH | e |
| ER | ə : r |
| EY | e i |
| F | f |
| G | G |
| HH | h |
| IH | i |
| IY | i : |
| JH | dʒ |
| K | k |
| L | l |
| M | m |
| N | n |
| NG | ŋ |
| OW | o u |
| OY | ɔ i |
| P | p |
| R | r |
| S | s |
| SH | ʃ |
| T | t |
| TH | θ |
| UH | u |
| UW | u : |
| V | v |
| W | w |
| Y | j |
| Z | z |
| ZH | ʒ |

FIG. 7

| ALPHABET PRONUNCIATION SYMBOL | PRONUNCIATION SYMBOL AUXILIARY DATA |
|---|---|
| AA | odd : AA D |
| AE | at : AE T |
| AH | hut : HH AH T |
| AO | ought : AO T |
| AW | cow : K AW |
| AY | hide : HH AY D |
| B | be : B IY |
| CH | cheese : CH IY Z |
| D | dee : D IY |
| DH | thee : DH IY |
| EH | Ed : EH D |
| ER | hurt : HH ER T |
| EY | ate : EY T |
| F | fee : F IY |
| G | gree : G R IY N |
| HH | he : HH IY |
| IH | it : IH T |
| IY | eat : IY T |
| JH | gee : JH IY |
| K | key : K IY |
| L | lee : L IY |
| M | me : M IY |
| N | knee : N IY |
| NG | ping : P IH NG |
| OW | oat : OW T |
| OY | toy : T OY |
| P | pee : P IY |
| R | read : R IY D |
| S | sea : S IY |
| SH | she : SH IY |
| T | tea : T IY |
| TH | theta : TH EY T AH |
| UH | hood : HH UH D |
| UW | two : T UW |
| V | vee : V IY |
| W | we : W IY |
| Y | yield : Y IY L D |
| Z | zee : Z IY |
| ZH | seizure : S IY ZH ER |

FIG. 8

| NOTATION | PRONUNCIATION SYMBOL |
|---|---|
| this | DH IH S |
| is | IH Z |
| a | AH |
| pen | P EH N |
| that | DH AE T |

INFORMATION PROCESSING APPARATUS, METHOD, PROGRAM, AND STORAGE MEDIUM FOR INPUTTING A PRONUNCIATION SYMBOL

FIELD OF THE INVENTION

The present invention relates to a process for inputting English pronunciation symbols.

BACKGROUND OF THE INVENTION

Upon developing a speech synthesis English dictionary or creating English phonetic text, an English pronunciation symbol string must be input. However, English pronunciation symbols cannot be intuitively input unlike Japanese reading.

As conventional methods of inputting English pronunciation symbols (about 40 symbols), a method of registering pronunciation symbols as external characters and selecting them from an external character symbol table, a method of setting each of pronunciation symbols in correspondence with one or two alphabets and inputting symbols like normal text, and the like are known (for example, see Japanese Patent Laid-Open No. 7-78133).

However, with the method of registering pronunciation symbols as external characters, the user must display the external character symbol table and select a symbol from it every time he or she inputs one pronunciation symbol, resulting in an inefficient input process. Also, since external characters are used, compatibility with other systems is poor.

Furthermore, with the method of setting each pronunciation symbol in correspondence with one or two alphabets, it is difficult for the user to intuitively recognize the correspondence between an alphabet string and pronunciation symbol and to accurately input symbols.

SUMMARY OF THE INVENTION

The present invention has been made in consideration of the above problems, and has as its object to provide a processing technique that allows the user to efficiently and accurately input pronunciation symbols.

In order to achieve the above object, an information processing apparatus according to the present invention comprises the following arrangement. That is, an information processing apparatus for inputting a pronunciation symbol corresponding to an English notation, comprising: pronunciation symbol information holding means for holding pronunciation symbol information indicating a relationship between a predetermined alphabet and a pronunciation symbol that starts from the predetermined alphabet; pronunciation symbol statistical information holding means for holding statistical information associated with a probability of occurrence of each pronunciation symbol immediately after a predetermined pronunciation symbol; display means for extracting pronunciation symbols corresponding to an input alphabet from the pronunciation symbol information, and displaying the extracted pronunciation symbols while sorting them on the basis of the statistical information; and determination means for determining a pronunciation symbol corresponding to the English notation from the displayed pronunciation symbols.

The information processing apparatus of the present invention allows the user to efficiently and accurately input pronunciation symbols.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows a pronunciation symbol table 105 of the information processing apparatus according to the embodiment of the present invention;

FIG. 4 shows an associative pronunciation symbol table 106 of the information processing apparatus according to the embodiment of the present invention;

FIG. 5 shows pronunciation symbol statistical information 107 of the information processing apparatus according to the embodiment of the present invention;

FIG. 6 shows pronunciation symbol image data 108 of the information processing apparatus according to the embodiment of the present invention;

FIG. 7 shows pronunciation symbol auxiliary data 109 of the information processing apparatus according to the embodiment of the present invention;

FIG. 8 shows an edit result database 118 of the information processing apparatus according to the embodiment of the present invention.

DETAILED DESCRIPTION OF THE PREFERRED EMBODIMENTS

Preferred embodiments of the present invention will now be described in detail in accordance with the accompanying drawings.

Figure 1:
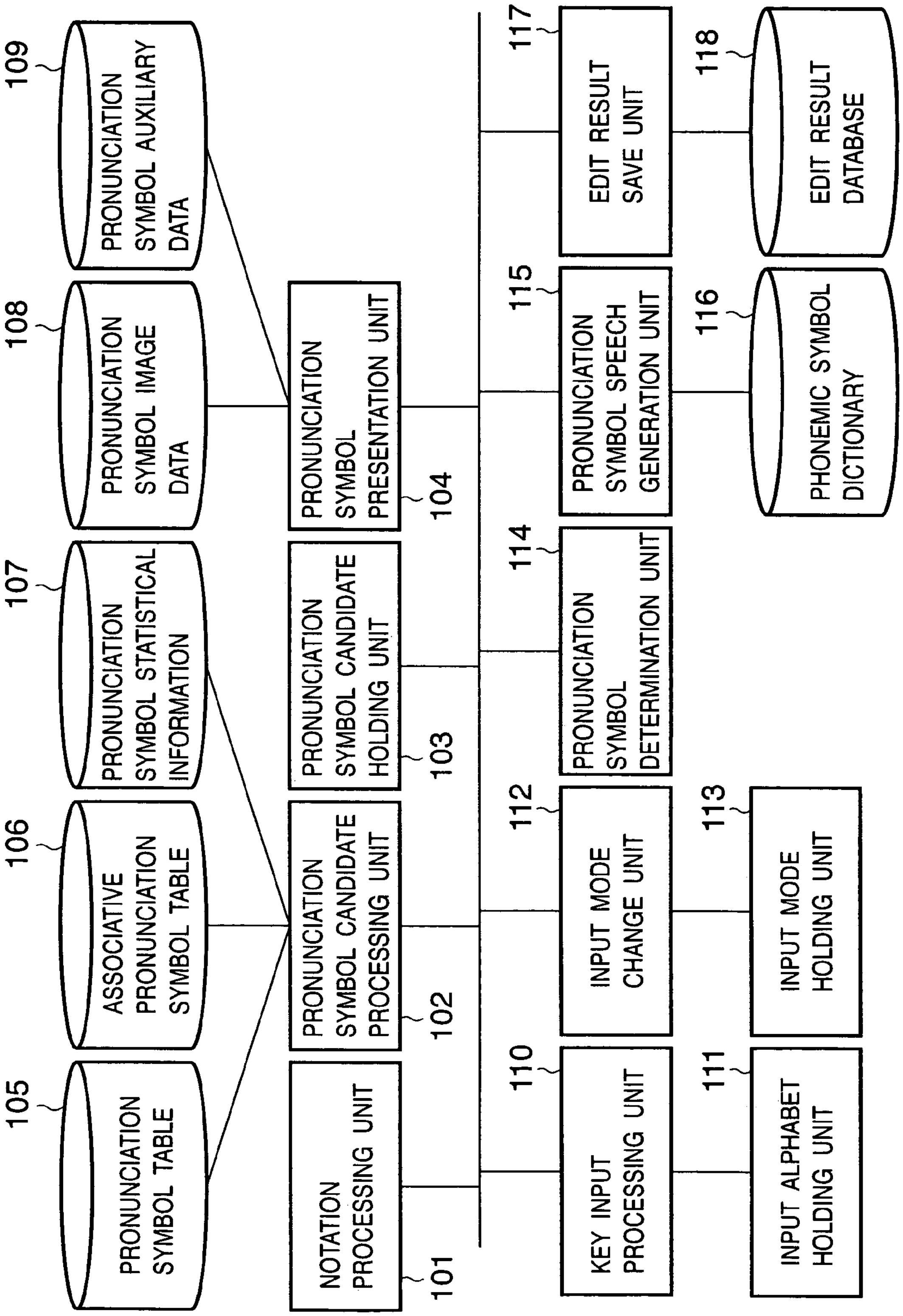
FIG. 1 is a block diagram showing the arrangement of an information processing apparatus according to an embodiment of the present invention.

FIG. 1 is a block diagram showing the arrangement of an information processing apparatus according to an embodiment of the present invention.

Reference numeral 101 denotes a notation processing unit that executes a process associated with English notations to which pronunciation symbols are to be given.

Reference numeral 102 denotes a pronunciation symbol candidate processing unit that executes a process associated with pronunciation symbol candidates. Reference numeral 103 denotes a pronunciation symbol candidate holding unit that holds pronunciation symbol candidates. Reference numeral 104 denotes a pronunciation symbol candidate presentation unit that presents pronunciation symbol candidates. Reference numeral 105 denotes a pronunciation symbol table that stores alphabets and pronunciation symbols each of which has a corresponding alphabet as its first character. FIG. 3 shows an example of the pronunciation symbol table.

Reference numeral 106 denotes an associative pronunciation symbol table that stores alphabets, and pronunciation symbols each of which is associable as the pronunciation of a given alphabet when that alphabet forms a part of an arbitrary English notion. FIG. 4 shows an example of the associative pronunciation symbol table. For example, pronunciation symbols of an English notation "able" is "EY1 B AH0 L," and "EY" is associable as the pronunciation of alphabet "a."

Reference numeral 107 denotes pronunciation symbol statistical information used to determine a presentation order of pronunciation symbol candidates. FIG. 5 shows an example of the pronunciation symbol statistical information. In this case, a statistical value is generated by multiplying by −1 the logarithm of the probability of occurrence of a pronunciation symbol of interest immediately after a forward pronunciation symbol, and normalizing the product to an integer by multiplying that product by an appropriate value. Symbol Φ indicates a case wherein no forward pronunciation symbol is present (i.e., a case wherein the pronunciation symbol of interest is located at the head of an English notation). The probability of occurrence of a pronunciation symbol of interest immediately after a forward pronunciation symbol can be generated based on a dictionary and the like.

Reference numeral 108 denotes pronunciation symbol image data as pairs of pronunciation symbols expressed by alphabets and image symbols (symbols generally used in a dictionary and the like) corresponding to these pronunciation symbols. FIG. 6 shows an example of the pronunciation symbol image data. Reference numeral 109 denotes pronunciation symbol auxiliary data as pairs of pronunciation symbols expressed by alphabets, and auxiliary data of these pronunciation symbols. FIG. 7 shows an example of the pronunciation symbol auxiliary data. "odd: AA D" indicates that the pronunciation symbol "AA" is a pronunciation of "AA" of "odd."

Reference numeral 110 denotes a key input processing unit that processes key operations input by the user upon editing pronunciation symbols. Reference numeral 111 denotes an input alphabet holding unit that holds alphabets input by the user.

Reference numeral 112 denotes an input mode change unit that changes an input mode between two input modes (i.e., a direct input mode and associative input mode). In the direct input mode, the user directly inputs and edits the first alphabet of a pronunciation symbol. In the associative input mode, the user inputs and edits some alphabets of an English notation to which pronunciation symbols are to be given. Reference numeral 113 denotes an input mode holding unit that holds the current input mode.

Reference numeral 114 denotes a pronunciation symbol determination unit that processes a pronunciation symbol determination operation. Reference numeral 115 denotes a pronunciation symbol speech generation unit for generating speech of pronunciation symbols. Reference numeral 116 denotes a phonemic symbol dictionary as acoustic data used to generate speech of pronunciation symbols. Reference numeral 117 denotes an edit result save unit that saves the edit results of pronunciation-symbols. Reference numeral 118 denotes an edit result database that holds the edit results of pronunciation symbols. FIG. 8 shows an example of the edit result database. In this case, the database holds pairs of English notations and pronunciation symbols.

Figure 2:
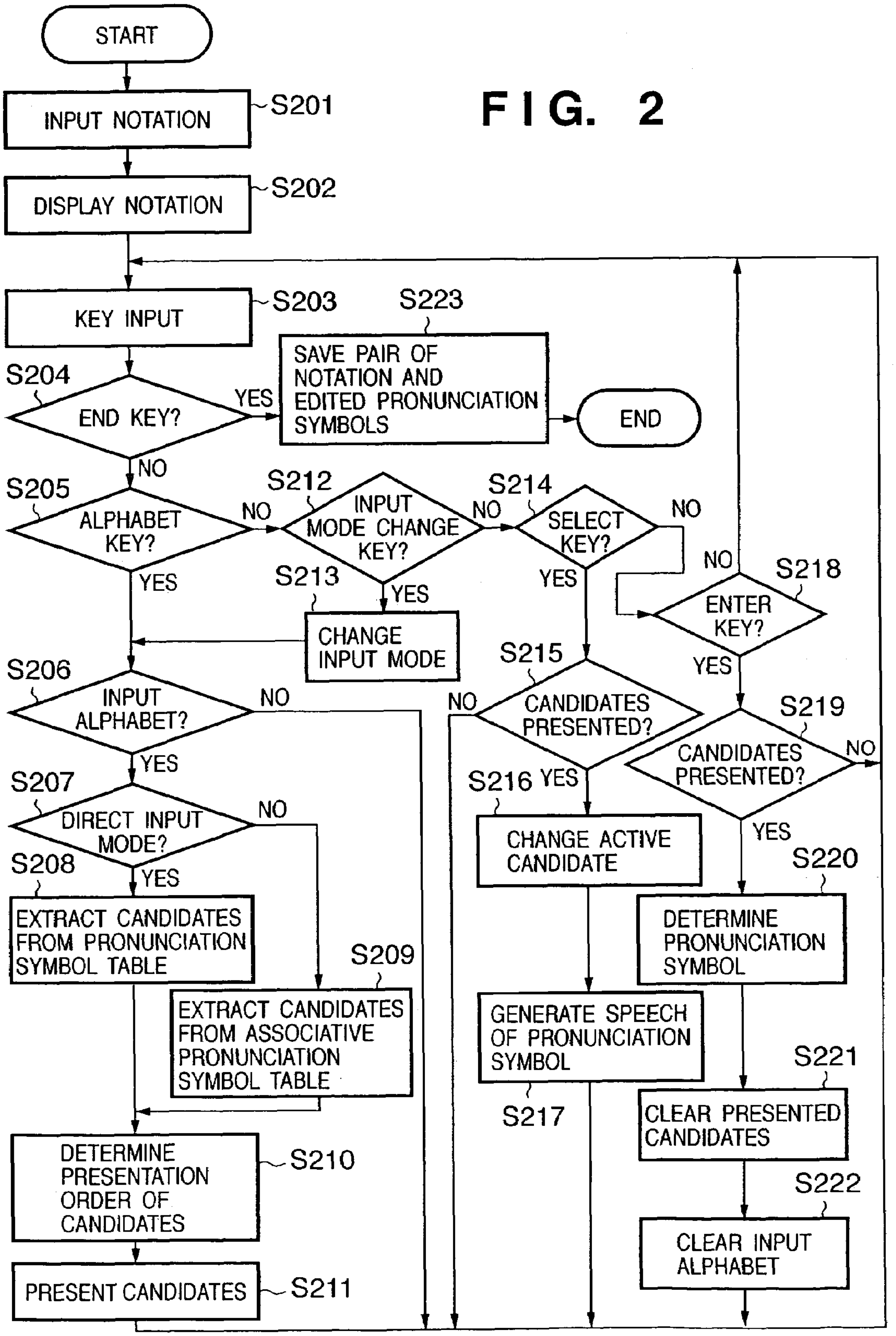
FIG. 2 is a flow chart showing the processing sequence of the information processing apparatus according to the embodiment of the present invention.

FIG. 2 is a flow chart showing the processing sequence in the information processing apparatus according to the embodiment of the present invention.

Figure 9:
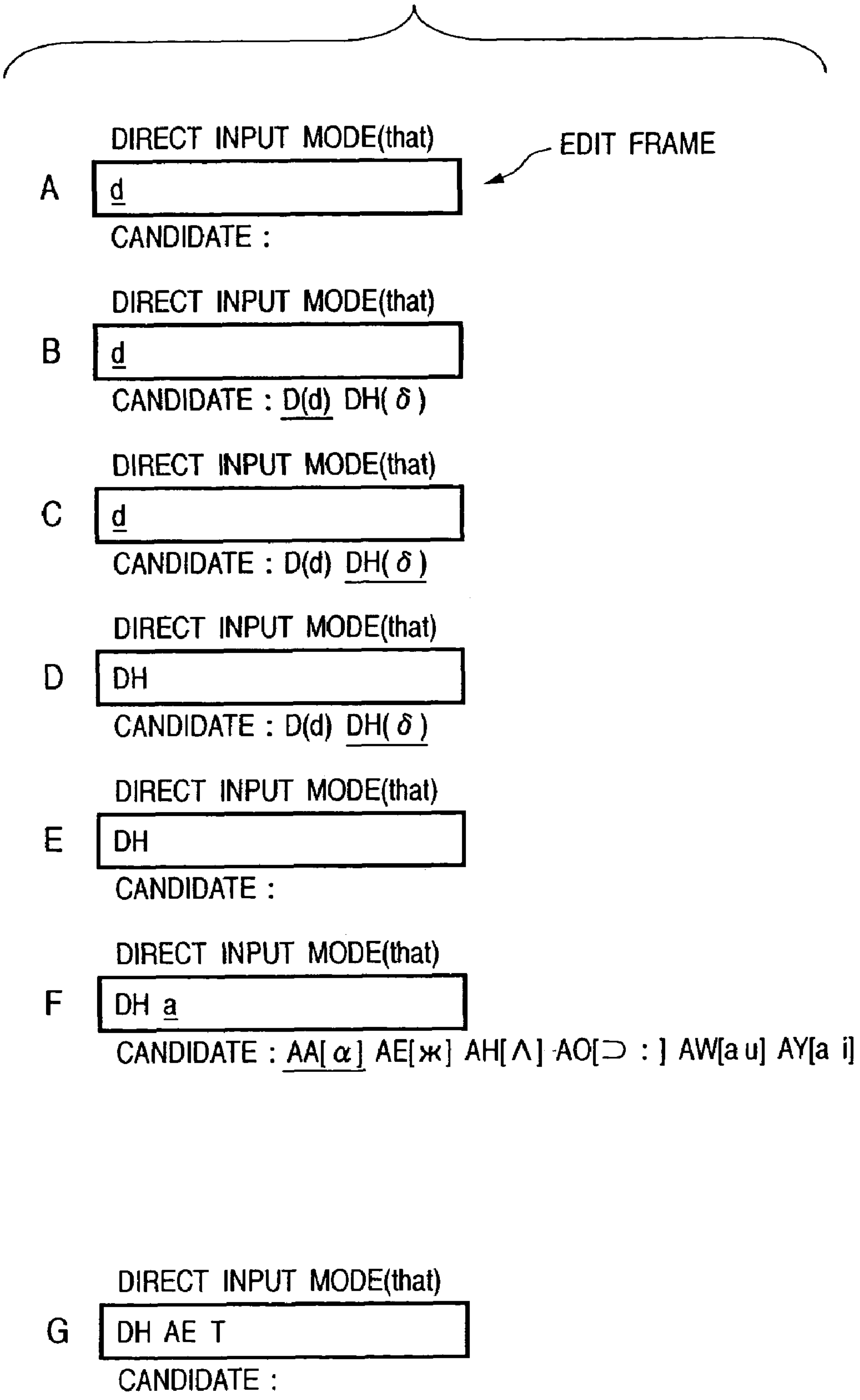
FIG. 9 shows an edit process of pronunciation symbols by the information processing apparatus according to the embodiment of the present invention.

In step S201, the user inputs an English notation to which pronunciation symbols are to be given. In step S202, the notation processing unit 101 displays the English notation input in step S201. A of FIG. 9 shows a display example (note that FIG. 9 shows display examples in the direct input mode). In this example, assume that pronunciation symbols corresponding to an English notation "that" are input.

In step S203, the user presses a given key, and the key input processing unit 110 detects the key pressed by the user.

The key input processing unit 110 checks in step S204 whether or not the key pressed by the user in step S203 is an "end key." If the pressed key is an "end key," the flow advances to step S223; otherwise, the flow advances to step S205.

The key input processing unit 110 checks in step S205 whether or not the key pressed by the user in step S203 is an "alphabet key." If the pressed key is an "alphabet key," the key input processing unit 110 stores that value in the input alphabet holding unit 111, and displays the input alphabet in an edit frame (A of FIG. 9). The flow then advances to step S206. If the pressed key is not an "alphabet key," the flow advances to step S212.

The pronunciation symbol candidate processing unit 102 checks in step S206 whether or not an alphabet is held in the input alphabet holding unit 111. If an alphabet is held, the flow advances to step S207; otherwise, the flow returns to step S203.

The pronunciation symbol candidate processing unit 102 determines with reference to the input mode holding unit 113 in step S207 whether or not the current input mode is the direct input mode. If the current input mode is the direct input mode, the flow advances to step S208; otherwise (i.e., the associative input mode), the flow-advances to step S209.

If the current input mode is the direct input mode, the pronunciation symbol candidate processing unit 102 reads out, from the pronunciation symbol table 105, pronunciation symbol candidates corresponding to the alphabet held in the input alphabet holding unit 111 in step S208. For example, if the alphabet is "a," the corresponding pronunciation symbol candidates are "AA, AE, AH, AO, AW, AY." Note that pronunciation symbols of the English notation "that" in this example (FIG. 9) include a pronunciation symbol starting from alphabet "d," that starting from alphabet "a," and that starting from alphabet "t." Hence, the user inputs alphabet "d" initially, and "D, DH" are read out as candidates of pronunciation symbols that start from "d."

On the other hand, if the current input mode is the associative input mode, the pronunciation symbol candidate processing unit 102 reads out, from the associative pronunciation symbol table 105, pronunciation symbol candidates corresponding to the alphabet held in the input alphabet holding unit 111, and holds them in the pronunciation symbol candidate holding unit 103 in step S209. For example, when the alphabet is "a," corresponding pronunciation symbol candidates are "AA, AE, AH, AO, AW, AY, EH, ER, EY, IH, IY, OW." In case of the English notation "that" in this example (FIG. 9), the user inputs alphabet "t," and "CH, DH, SH, T, TH" are read out as pronunciation symbol candidates.

In step S210, the pronunciation symbol candidate processing unit 102 gives statistical values to the pronunciation symbol candidates held in the pronunciation symbol candidate holding unit 103 with reference to the pronunciation symbol statistical information 107. Furthermore, the unit 102 sorts the pronunciation symbol candidates in ascending order of statistical value.

In step S211, the pronunciation symbol candidate presentation unit 104 assigns image data to the pronunciation symbol candidates held in the pronunciation symbol candidate holding unit 103 with reference to the pronunciation symbol image data 108. Furthermore, the unit 104 presents the pronunciation symbol candidates assigned with the image data to the user. B of FIG. 9 shows a display example. In this case, pronunciation symbol candidates "D[d] DH[δ]" corresponding to user's input "d" are presented. Also, the first candidate "D[d]" is presented in an active state.

In this example, the unit 104 presents pronunciation symbol candidates assigned with the pronunciation symbol image data 108 to the user. Alternatively, the unit 104 may present pronunciation symbol candidates assigned with the pronunciation symbol auxiliary data 109 to the user. In this case, "D[dee: D IY] DH[thee: DH IY]" are presented to the user.

The key input processing unit 110 checks in step S212 whether or not the key pressed by the user in step S203 is an "input mode change key." If the pressed key is an "input mode change key," the flow advances to step S213; otherwise, the flow advances to step S214.

In step S213, the input mode change unit 112 refers to the input mode held in the input mode holding unit 113. If the input mode is the "direct input mode" it is changed to the "associative input mode," or vice versa, and the flow advances to step S206.

The key input processing unit 110 checks in step S214 if the key pressed by the user in step S203 is a "select key." If the pressed key is a select key, the flow advances to step S215; otherwise, the flow advances to step S218.

The pronunciation symbol candidate presentation unit 104 checks in step S215 if pronunciation symbol candidates are presented to the user. If pronunciation symbol candidates are presented, the flow advances to step S216; otherwise, the flow returns to step S203.

In step S216, the pronunciation symbol presentation unit 104 changes an active one of the pronunciation symbol candidates presented to the user to the next candidate. The active candidate is, for example, underlined. C of FIG. 9 shows an example.

In step S217, the pronunciation symbol speech generation unit 115 reads out speech data of the pronunciation symbol which is newly activated in step S216 from the phonemic symbol dictionary 116 and generates that speech data. The flow then returns to step S203.

The key input processing unit 110 checks in step S218 if the key pressed by the user in step S203 is an "enter key." If the pressed key is an "enter key," the flow advances to step S219; otherwise, the flow returns to step S203.

The pronunciation symbol candidate presentation unit 104 checks in step S219 if pronunciation symbol candidates are presented to the user. If pronunciation symbol candidates are presented, the flow advances to step S220; otherwise, the flow returns to step S203.

In step S220, the pronunciation symbol candidate presentation unit 104 presents the active pronunciation symbol in place of the alphabet in the edit frame. D of FIG. 9 shows an example.

In step S221, the pronunciation symbol candidate presentation unit 104 clears the presented candidates. E of FIG. 9 shows an example. The pronunciation symbol candidate processing unit 102 clears the pronunciation symbol candidates held in the pronunciation symbol candidate holding unit 103, and the flow advances to step S222.

In step S222, the key input processing unit 110 clears the alphabet held in the input alphabet holding unit 111, and the flow returns to step S203. The aforementioned processes are repeated for the next pronunciation symbol (F of FIG. 9), thus finally inputting pronunciation symbols shown in G of FIG. 9.

In step S223, the edit result save unit 117 saves a pair of the input English notation and the edited pronunciation symbols in the edit result database 118.

As can be seen from the above description, according to this embodiment, in the direct input mode, the user need only input the first alphabet of a pronunciation symbol to display pronunciation symbols that start from the input alphabet and are sorted in descending order of predetermined probability of occurrence. Hence, compared to selection from an external character symbol table (about 40 symbols), the input efficiency can be greatly improved. In the associative input mode, pronunciation symbols when an alphabet forms a part of an arbitrary English notation are stored as associative pronunciation symbol information for respective alphabets. Every time the user inputs each alphabet that forms an English notation, pronunciation symbols corresponding to the input alphabet are displayed while being sorted in descending order of predetermined probability of occurrence. Hence, compared to the conventional method (a method setting a pronunciation symbol in correspondence with one or two alphabets), the correspondence between alphabets and pronunciation symbols is clear, and an accurate input can be realized. As a result, pronunciation symbols can be efficiently and accurately input.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

What is claimed is:

1. An information processing apparatus for inputting a pronunciation symbol corresponding to an English notation, comprising:

pronunciation symbol information holding means for holding pronunciation symbol information indicating a relationship between a predetermined alphabet and a pronunciation symbol that starts from the predetermined alphabet;

associative pronunciation symbol information holding means for holding associative pronunciation symbol information indicating a relationship between a predetermined alphabet and a pronunciation symbol when the predetermined alphabet forms a part of an arbitrary English notation;

pronunciation symbol statistical information holding means for holding statistical information associated with a probability of occurrence of each pronunciation symbol immediately after a predetermined pronunciation symbol;

input mode change means for changing an input mode between a first input mode and a second input mode;

display means for extracting pronunciation symbols corresponding to the alphabet inputted by a user from the pronunciation symbol information if the input mode is the first input mode and from the associative pronunciation symbol information if the input mode is the second input mode, and displaying the extracted pronunciation symbols with corresponding image symbols while sorting the extracted pronunciation symbols on the basis of the statistical information; and determination means for determining a pronunciation symbol corresponding to the English notation from the displayed pronunciation symbols.

2. An information processing method of an information processing apparatus for inputting a pronunciation symbol corresponding to an English notation, comprising:

an input mode change step of changing an input mode between a first input mode and a second input mode;

an extracting step of extracting pronunciation symbols corresponding to an alphabet inputted by a user from pronunciation symbol information indicating a relationship between a predetermined alphabet and a pronunciation symbol that starts from the predetermined alphabet if the input mode is the first input mode, and from associative pronunciation symbol information indicating a relationship between a predetermined alphabet and a pronunciation symbol when the predetermined alphabet forms a part of an arbitrary English notation if the input mode is the second mode;

a display step of displaying the extracted pronunciation symbols with corresponding image symbols while sorting the extracted pronunciation symbols on the basis of statistical information associated with a probability of occurrence of each pronunciation symbol immediately after a predetermined pronunciation symbol; and a determination step of determining a pronunciation symbol corresponding to the English notation from the displayed pronunciation symbols.

3. A control program for making a computer implement an information processing method of claim 2.

4. A storage medium storing a control program for making a computer implement an information processing method of claim 2.

* * * * *

UNITED STATES PATENT AND TRADEMARK OFFICE

CERTIFICATE OF CORRECTION

PATENT NO. : 7,349,846 B2
APPLICATION NO. : 10/807305
DATED : March 25, 2008
INVENTOR(S) : Aizawa It is certified that error appears in the above-identified patent and that said Letters Patent is hereby corrected as shown below:

COLUMN 3:
Line 2, “notion,” should read --notation.--.
Line 57, “pronunciation-symbols.” should read --pronunciation symbols.--.

Signed and Sealed this

Sixteenth Day of June, 2009

John Doll

JOHN DOLL
*Acting Director of the United States Patent and Trademark Office*